(12) United States Patent
Gozu et al.

(10) Patent No.: US 6,338,861 B1
(45) Date of Patent: Jan. 15, 2002

(54) PROCESS OF PRODUCTION OF NATURAL FLAVOR OR FRAGRANCE

(75) Inventors: Yoko Gozu; Mineyuki Yokoyama; Shoko Yamaguchi; Katsuyuki Yomogida; Shinichiro Haze, all of Yokohama (JP)

(73) Assignee: Shiseido Company, Ltd., Tokyo (JP)

( * ) Notice: Subject to any disclaimer, the term of this patent is extended or adjusted under 35 U.S.C. 154(b) by 0 days.

(21) Appl. No.: 09/276,737

(22) Filed: Mar. 26, 1999

(30) Foreign Application Priority Data

Mar. 26, 1998 (JP) .......................... 10-098299
Oct. 27, 1998 (JP) .......................... 10-321544

(51) Int. Cl.$^7$ .................... A61K 35/78; C12N 9/08; C12N 9/26; C12N 9/30
(52) U.S. Cl. .................. 424/725; 435/192; 435/201; 435/203
(58) Field of Search .............. 424/195.1, 725; 435/192, 201, 203

(56) References Cited

U.S. PATENT DOCUMENTS

| 4,257,945 A | * 3/1981 | Martel |
| 5,100,790 A | 3/1992 | Gil et al. |

FOREIGN PATENT DOCUMENTS

| EP | 0 353 683 | 2/1990 |
| EP | 0 425 372 | 5/1991 |
| EP | 0 443 926 | 8/1991 |
| EP | 0 815 838 | 1/1998 |
| FR | 2 448 567 | 9/1980 |
| FR | 2 620 702 | 3/1989 |
| FR | 2 680 798 | 3/1993 |
| JP | 2-86785 | 3/1990 |
| JP | 6-502685 | 3/1994 |

OTHER PUBLICATIONS

CAPLUS English abstract of EP 309,339 A1, Mar. 1989.*
The Dialog Corporation; Jan. 29, 1998; 16 sheets.
Bagdasarova et al., "Bioconversion of Terpenoids By Iris Sibiricia Cell Cultures", Chemical Abstracts XP–002153445, vol. 110, No. 9, (Feb. 27, 1989).
Database WPI, Section Ch, Week 199715 Derwent Publications Ltd., London, GB., XP–002153446, (Feb. 4, 1997).

* cited by examiner

Primary Examiner—Leon B. Lankford, Jr.
Assistant Examiner—Susan D. Coe
(74) Attorney, Agent, or Firm—Foley & Lardner

(57) ABSTRACT

A natural flavor or fragrance can be easily and effectively produced by using a "unicellularized plant", obtained by unicellularizing, without destroying, the cells of a plant usable as a starting material for a natural flavor or fragrance, as a material for the natural flavor or fragrance and further applying an enzymatic treatment or chemical treatment or continuously heating the same, to thereby remarkably shorten the aging period for producing the natural flavor or fragrance, or by homogenizing a plant usable as the starting material quickly after harvesting to thereby promote the aging.

6 Claims, 1 Drawing Sheet

PROCESS OF PRODUCTION OF NATURAL FLAVOR OR FRAGRANCE

BACKGROUND OF THE INVENTION

1. Field of the Invention

The present invention relates to flavors or fragrances, particularly natural flavors or fragrances. More specifically, it relates to a process for production of a natural flavor or fragrance capable of producing a natural flavor or fragrance more efficiently.

2. Description of the Related Art

Flavors or fragrances are becoming essential elements in perfume cosmetics, food, and other various fields.

Flavors or fragrances may be roughly divided into "natural flavors or fragrances" obtained by separation from naturally existing fragrance or flavor plants and animals and "synthetic flavors or fragrances" obtained by chemical synthesis.

Synthetic flavors or fragrances can all be mass produced relatively easily by chemical techniques, but natural flavors or fragrances are often subject to various types of restrictions in terms of mass production due to the fact that the starting materials are natural materials.

The typical restrictive factor thereof is "aging".

That is, many cases are observed, in particular in the case of plant-derived natural flavors or fragrances, where there is no value to the flavor or fragrance in the fresh state and where the value as a natural flavor or fragrance is only able to be realized by aging over a long period of time to produce essential oils.

This aging period can require several years in the longer cases. Due to this long aging period, natural flavors or fragrances become scarce items. This is becoming a major factor obstructing their broader use.

Therefore, various attempts have been made to shorten the aging period for natural flavors or fragrances (see Japanese National Patent Publication (Kohyo) No. 6-502685, Japanese Unexamined Patent Publication (Kokai) No. 2-86785, etc.), but these attempts cannot really be said to have sufficiently shortened the aging period for natural flavors or fragrances yet.

SUMMARY OF INVENTION

Accordingly, the objects of the present invention is to provide a means for shortening the aging period for natural flavors or fragrances to enable easy production of natural flavors or fragrances.

The present inventors engaged in repeated intensive studies for solving this problem. As a result, we found that by using a "unicellularized plant", obtained by unicellularizing, not destroying, the cells of a plant usable as a starting material for a natural flavor or fragrance, as the material for the natural flavor or fragrance and further by applying enzymatic treatment and/or chemical treatment or by continuously heating the same, it is possible to remarkably shorten the aging period for producing a natural flavor or fragrance.

That is, in accordance with the first aspect of the present invention, there is provided a process for producing a natural flavor or fragrance comprising the steps of:

unicellularizing a plant usable as a starting material for a natural flavor or fragrance to promote the aging of the natural flavor or fragrance in the unicellularized plant (hereinafter also referred to as the "unicellularized plant") and collecting the aged natural flavor or fragrance.

Further, the first aspect of the present invention provides a process for producing a natural flavor or fragrance comprising continuously heating the unicellularized plant to promote aging of the natural flavor or fragrance in the unicellularized plant and collecting the aged natural flavor or fragrance.

Further, the first aspect of the present invention provides a process for producing a natural flavor or fragrance comprising applying an enzymatic treatment and/or chemical treatment to the unicellularized plant to promote aging of the natural flavor or fragrance in the unicellularized plant and collecting the aged natural flavor or fragrance.

Further, the first aspect of the present invention provides a process for producing a natural flavor or fragrance comprising applying an enzymatic treatment and/or chemical treatment to a unicellularized plant and further continuously heating the same to promote aging of the natural flavor or fragrance in the unicellularized plant and collecting the aged natural flavor or fragrance.

The present inventors further engaged in repeated intensive studies for solving the above problem. As a result, we also found that by using a "homogenized plant", obtained by homogenizing quickly after harvest a plant usable as a starting material for a natural flavor or fragrance and further by continuously heating the homogenized plant, it is possible to remarkably shorten the aging period for producing a natural flavor or fragrance.

That is, in accordance with the second aspect of the present invention, there is provided a process for producing a natural flavor or fragrance comprising homogenizing a plant usable as a starting material for a natural flavor or fragrance quickly after harvest to promote the aging of the natural flavor or fragrance in the homogenized plant and collecting the aged natural flavor or fragrance.

Further, the second aspect of the present invention provides a process for producing a natural flavor or fragrance comprising continuously heating the homogenized plant to promote aging of the natural flavor or fragrance in the homogenized plant and collecting the aged natural flavor or fragrance.

BRIEF DESCRIPTION OF DRAWING

The present invention will be better understood from the following description with reference to FIG. 1, which is a graph showing the degree of the iris in Test Samples I-1 to I-4 and II-1 to II-2.

DESCRIPTION OF THE PREFERRED EMBODIMENTS

Figure 1:
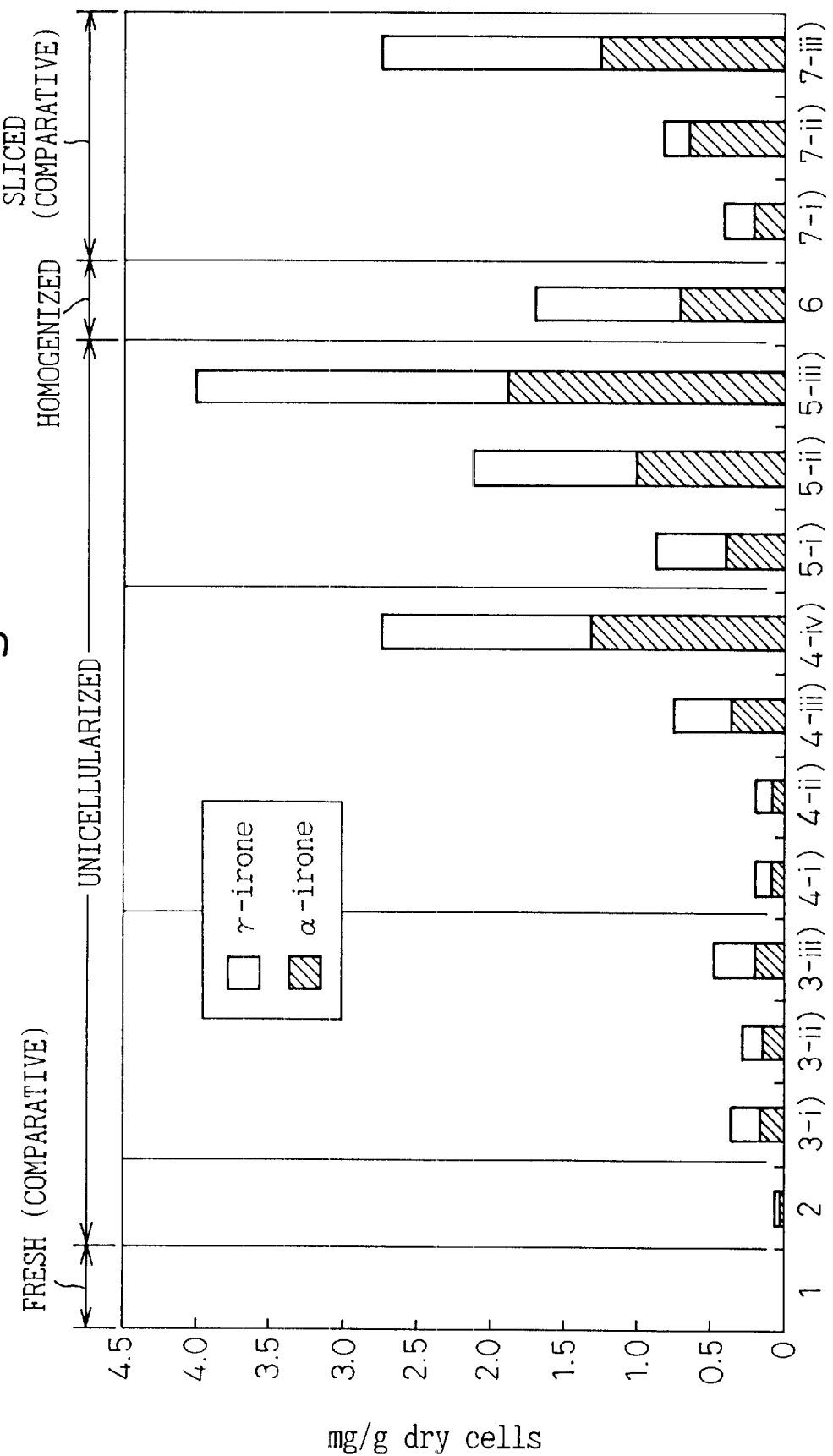

The first aspect of the present invention will now be explained below.

The process for producing a natural flavor or fragrance according to the first aspect of the present invention (hereinafter referred to as the "natural flavor or fragrance production process of the present first invention") is a process for producing a natural flavor or fragrance using a unicellularized plant as the starting material for the desired natural flavor or fragrance.

The "unicellularized plant" used herein means natural materials having cell walls (e.g., plants, seaweeds or algae), which are decomposed into cellular units by selectively enzymatically treating the intercellular pectin, without destroying the cell walls, whereby a pultaceous or liquid composition is formed or a freeze-dried product thereof is produced.

Such unicellularized plants are already being used, ingredients for functional foods and skin application agents, but there have not been any examples of use, as the starting materials for natural flavors or fragrances.

The materials for the unicellularized plant are vegetables, fruits, seaweed or algae, herbs, and other plants having cell walls as explained above and are not particularly limited so long as they are plant materials which can serve as starting materials for a natural flavor or fragrance. The specific plant can be suitably selected based upon the type of the natural flavor or fragrance produced. For example, iris, nutmeg, patchouli, vanilla, vetivert, oakmoss, clove, costus, wintergreen, cascarilla, chamomile, cardamom, caraway, carrot, guaiac, cumin, citronellal, cinnamon, star anise, spearmint, savory, sage, geranium, thyme, parsley seed, buchu, bergamot, hops, eucalyptus, mugwort, laurel, etc. may be mentioned, but the invention is not limited to these examples.

Among these starting materials, it is effective to apply the present invention to plant materials where the aging period required for aging the flavor or fragrance is long. For example, the aging period for iris is an extremely long three years. This long aging period is a major factor for the high price of iris fragrance. There would be extremely great significance in shortening the aging period by the present invention.

The typical method of unicellularization treatment is the method of selective decomposed by enzymatic treatment with pectinase etc. of the intercellular substances comprised of pectin etc.

As plant tissue unicellularization enzymes used in the enzymatic treatment, for example, polygalacturonase and pectinase derived from *Aspergillus niger*, Rhizopus sp., etc.; pectin lyase derived from *Aspergillus niger, Aspergillus japonicus*, and other Aspergillus sp., etc.; pectolyase derived from *Aspergillus japonicus* etc.; etc. may be mentioned, but the enzymes are not particularly limited so long as they can selectively decompose the intercellular substances of plants.

For these plant tissue unicellularization enzymes, it is possible to use those isolated from enzyme materials such as, for example, the above Rhizopus sp. and Aspergillus sp. by ordinary known methods and it is possible to use commercially available ones.

When the plant tissue unicellularization enzymes are allowed to act on the material to be unicellularized, it is of course desirable to allow to act under the optional conditions such as the optimal temperature, optimal pH, for the enzymes and to use the minimum amounts.

In general, the optimal temperature of a plant tissue unicellularization enzyme is 35° C. to 45° C. and the optimal pH is 4 to 5.

Further, by sieving out the plant outer skin, fibers, cores, seeds, etc. which tend to remain after the enzymatic reaction using, for example, a sieve of an around 20 mesh, it is possible to obtain a pultaceous unicellular suspension usable in the natural flavor or fragrance production process of the present first invention.

Further, it is also possible to use as the starting material of the natural flavor or fragrance production process of the present invention not this pultaceous unicellular suspension, but a unicellular paste obtained by dehydrate this suspension by, for example, centrifugation (1500×g for at least about 10 minutes or more) or a dried product thereof.

Note that these unicellular pastes or dried products may be mentioned as preferable forms of the unicellular plant in terms of enabling efficient execution of the steps in the natural flavor or fragrance production process of the present invention.

In the unicellularized plant thus obtained, the aging period of the flavor or fragrance is shortened. It is possible to further shorten the aging period of the flavor or fragrance in the unicellularized plant by applying, to the unicellularized plant, an enzymatic treatment or chemical treatment, and/or continuous heating treatment.

The temperature setting in the continuous heating treatment applied to the unicellularized plant should be suitably selected, depending upon the type or form of the unicellularized plant selected etc., but it is possible to promote aging of the natural flavor or fragrance in the unicellularized plant at generally 40° C. to 95° C., preferably 45° C. to 70° C.

On the other hand, it is possible to promote the aging of the natural flavor or fragrance in the unicellularized plant by applying a chemical treatment and/or enzymatic treatment to the unicellularized plant. As such chemical treatment means, for example, potassium permanganate treatment, activated manganese dioxide treatment, manganese (III) salt treatment, chromic acid treatment, osmium tetraoxide treatment, ruthenium tetraoxide treatment, or ozone treatment etc. may be mentioned.

Further, as the enzymatic treatment means, for example, peroxidase treatment, lipoxygenase treatment, xantinoxidase treatment, etc. may be mentioned.

By performing a combination of the two of the continuous heating and chemical treatment and/or enzymatic treatment of the unicellularized plant, it is possible to further promote the aging of the natural flavor or fragrance in the unicellularized plant.

As a typical mode of this combination treatment, first the chemical treatment and/or enzymatic treatment is applied to the unicellularized plant obtained through the above-mentioned process, then this is continuously heated to promote the aging of the flavor or fragrance by automatic oxidation etc.

Further, it is also possible to apply the chemical treatment and/or enzymatic treatment at periodic intervals during the continuous heating.

As the reason why the aging of the natural flavor or fragrance in the unicellularized plant is promoted by applying the above continuous heating or chemical treatment and/or enzymatic treatment to the unicellularized plant, it is believed that, since the ingredients and enzymatic activity of the plant cells themselves are substantially unimpaired in the unicellularized plant and each of the cells exist in an independent state, the action of this treatment is directly felt, but the exact mechanism is not clear.

The natural flavor or fragrance aged in the unicellularized plant by the above aging promotion treatment may be collected by an ordinary known collecting method, for example, the steam distillation method, extraction method, pressing method, deterpene-sesquiterpene method, etc. to produce the desired natural flavor or fragrance.

The second aspect of the present invention will be explained below.

The process for producing a natural flavor or fragrance according to the second aspect of the present invention (hereinafter referred to as the "natural flavor or fragrance production process of the present second invention") is a process for producing a desired natural flavor or fragrance using a homogenized plant.

The term "homogenized plant" means a plant which is pulverized and homogenized, for example, a plant which is mechanically pulverized by a homogenizer etc. to give fine particles, a liquid or paste, or dried products thereof.

In the present second invention, the homogenization of the plant is performed quickly after the plant is harvested, in other words, before the fresh state after harvesting is lost. It is well known in the production of natural flavors or fragrances to pulverize the natural material after a certain extent of an aging period has passed, but there have not been any examples of homogenization of a plant quickly after harvesting it. Thus, there have been no examples of production of a natural flavor or fragrance using a homogenized plant obtained by homogenizing the plant quickly after harvest.

The plant for homogenization is not particularly limited so long as it can use as a starting material for a natural flavor or fragrance such as vegetables, fruits, seaweed, herbs, algae, etc. The specific plant can be suitably selected based upon the type of the natural flavor or fragrance produced. For example, iris, nutmeg, patchouli, vanilla, vetivert, oakmoss, clove, costus, wintergreen, cascarilla, chamomile, cardamom, caraway, carrot, guaiac, cumin, citronellal, cinnamon, star anise, spearmint, savory, sage, geranium, thyme, parsley seed, buchu, bergamot, hops, eucalyptus, mugwort, laurel, etc. may be mentioned, but the invention is not limited to these examples.

It is effective to apply the present invention to plants among these starting materials where the aging period required for aging the flavor or fragrance is long. For example, the aging period for iris is an extremely long three years. This long aging period is a major factor for the high price of iris fragrance. There would be extremely great significance in shortening the aging period by the present invention.

The method of homogenizing the plant is not particularly limited so long as it gives a homogenized plant, but as typical methods, the method of mechanically pulverizing a plant by a homogenizer, homomixer, blender, or the like to obtain fine particles or a method of further drying the fine particles by freeze-drying etc. to obtain a dried product may be mentioned.

Alternatively, the method of cutting the plant, in some cases, then suspending it in water and homogenizing the suspension by a homogenizer, homomixer, blender, or the like to obtain a liquid or a method of further dehydrating the liquid by centrifugation etc. to obtain a paste or the method of drying that liquid or paste to obtain a dried product may be mentioned.

Note that among these starting materials, fine particles, a paste, or dried product may be mentioned as preferable forms of the homogenized plant in terms of enabling efficient execution of the steps in the natural flavor or fragrance production process of the present second invention.

In the homogenized plant thus obtained, the aging period of the flavor or fragrance is shortened. It is possible to further shorten the aging period of the flavor or fragrance in the homogenized plant by continuously heating the homogenized plant.

The temperature in the continuous heating treatment applied to the homogenized plant should be suitably selected depending upon the type or form of the homogenized plant selected etc., but it is possible to promote aging of the natural flavor or fragrance in the homogenized plant at generally 40° C. to 95° C., preferably 45° C. to 700° C.

The natural flavor or fragrance aged in the homogenized plant by the above aging promotion treatment may be collected by an ordinary known collecting method, for example, the steam distillation method, extraction method, pressing method, deterpene-sesquiterpene method, etc. to produce the desired natural flavor or fragrance.

The natural flavor or fragrance produced by the natural flavor or fragrance production process of the first and second aspects of the present invention may be used in perfume cosmetics and food alone or in combination with other flavors or fragrances in the same way as ordinarily obtained natural flavors or fragrances.

EXAMPLES

The present invention will now be explained in further detail by the following Examples but the technical scope of the present invention is not intended to limit the present invention to these Examples etc.

Example I

Preparation of Unicellularized Iris Root 61.54 g of the rootstalk of iris (*Iris parida, Iridaceae*) was minced. Commercially available pectinase [Macellotyme R-200 (made by Yakult Honsha, 0.08%:49.2 mg)] dissolved in an equal part of purified water (62 ml) was added and the resultant mixture was stirred at 42° C. for 6 hours. After the end of the reaction, the mixture was filtered through a 710 μm mesh sieve to remove the residue whereby a pultaceous suspension of unicellularized iris root was obtained.

This pultaceous suspension of the unicellularized iris root was freeze-dried (hereinafter this freeze-dried product will be called "unicellularized iris root") and used for the following test.

Aging Test of Iris Fragrance in Unicellularized Iris Root

The test systems explained below were used for an aging test of the iris fragrance in unicellularized iris root.

Note that the degree of aging of the iris fragrance was indexed to the content of irones (α-irone, γ-irone)— important ingredients of the iris fragrance in an extract obtained by Soxhlet extraction of the test sample in the test systems. The greater the content, the more advanced the aging shown.

Test system I-1: Minced and freeze-dried untreated iris root (0.5 g) allowed to stand overnight at room temperature to obtain Test Sample I-1.

Test system I-2: Unicellularized iris root [freeze-dried product (same below)] allowed to stand overnight at room temperature to obtain Test Sample I-2.

Test system I-3: Unicellularized iris root subjected to enzymatic treatment or chemical treatment. [*1]

Test system I-4: Unicellularized iris root continuously heated at 50° C.

*1: Regarding enzymatic treatment or chemical treatment,
i) Enzymatic Treatment with peroxidase To 0.5 g of unicellularized iris root were added 85 mM sodium-phosphate-citrate-borate buffer (pH 7.4), 5 mM hydrogen peroxide, horseradish peroxidase (made by Toyobo), and 10% ethanol. This mixture was allowed to stand overnight at 25° C., then the unicellularized iris root was freeze-dried to obtain peroxidase treated unicellularized iris root [i.e., Test Sample 3-i)]

ii) Enzymatic Treatment with Lipoxygenase

To 0.5 g of unicellularized iris root were added 0.2 M borate buffer (pH 9.0), 6.3 U soybean lipoxygenase (made by Serva), and 10% ethanol. This mixture was allowed to stand overnight at 25° C., then the unicellularized iris root was freeze-dried to obtain lipoxygenase treated unicellularized iris root [i.e., Test Sample 3-ii)]

iii) Chemical treatment with potassium permanganate

To 0.6 g of unicellularized iris root were added 10 mL of acetone and 200 mg of potassium permanganate. The mixture was refluxed, while being stirred for 90 minutes, then the reaction solution was filtered. The residue was washed with acetone/ether, the filtrate was evaporated, then the residue was again washed with water/ethanol followed by dehydrate and evaporation to obtain potassium permanganate treated unicellularized iris root [i.e., Test Sample I-3-iii)]

Table I-1 shows the results of a comparison of the content of irones in the Test Sample I-1 and Test Sample I-2 immediately after the start of the test and six months after the start of the test.

TABLE I-1

|  | Test Sample I-1 | | Test Sample I-2 | |
| --- | --- | --- | --- | --- |
|  | $\alpha$-irone | $\gamma$-irone | $\alpha$-irone | $\gamma$-irone |
|  | Content of irones (mg/g dry cell) | | | |
| Immediately after start of test | 0 | 0 | 0.04 | 0.04 |
| 6 months after start of test | 0.08 | 0.12 | 1.31 | 1.43 |

From these results, it became clear that the aging of the iris was promoted by just unicellularizing the plant (Test System I-2).

Further, FIG. 1 is a graph showing the degree of aging of the iris in Test Samples I-1 to I-4.

The abscissa in FIG. 1 shows the content of irones (□: $\gamma$-irone, ▨: $\alpha$-irone (mg/g dry cell)). Further, on the ordinate, 1 indicates the minced Test Sample I-1 (i.e., fresh) (immediately after start of test), 2 indicates the unicellularized Test Sample I-2 (immediately after start of test), 3 indicates the unicellularized Test Sample I-3 (immediately after start of test 3-i): peroxidase treatment, 3-ii): lipoxygenase treatment, 3-iii): potassium permanganate treatment), 4 indicates the Test Sample I-2 (4-i): 11 days after start of test, 4-ii): 20 days after start of test, 4-iii): 46 days after start of test, 4-iv): 6 months after start of test), and 5 indicates the Test Sample I-4 (5-i): 11 days after start of test, 5-ii): 20 days after start of test, and 5-iii): 46 days after start of test).

From the results shown in FIG. 1, it became clear that, by applying a specific enzymatic treatment or chemical treatment to the unicellularized plant, there was a tendency for aging of the iris to be promoted.

Further, it became clear that by continuously heating the unicellularized plant, the aging of the iris was remarkably promoted.

Thus, according to the first aspect of the present invention, there is advantageously provided a means for promoting the aging of a natural flavor or fragrance and remarkably shortening the aging period, which is often extremely long, when producing a natural flavor or fragrance.

Example II

Preparation of Homogenized Iris Root

The rootstalk of iris (*Iris parida*, Iridaceae) was harvested. 61.54 g of the rootstalk was minced quickly after harvesting, suspended in an equal amount of ion exchange water, then homogenized by a homogenizer at 10000 rpm for 1 minute five times. Next, it was dehydrated by centrifugation (1500×g for at least about 10 minutes or more) to obtain paste-like homogenized iris root.

This paste-like homogenized iris root was freeze-dried to prepare a freeze-dried product (hereinafter this freeze-dried product will be called "homogenized iris root") which was used for the following test.

Aging Test of Iris Fragrance in Homogenized Iris Root

Homogenized iris root (i.e., "test sample") and, for comparison, iris rootstalk quickly sliced after harvesting (i.e., "standard sample") were used for an aging test of the iris fragrance in homogenized iris root.

Specifically, for the Test Sample II-1-i), the degree of aging of the iris fragrance was investigated immediately after the preparation of the homogenized iris root and, for the Test Sample II-1-ii), after the homogenized iris root was placed in a hermetic container after preparation and continuously heated at 50° C. for 27 days. Further, for the Standard Sample II-2, the degree of aging of the iris fragrance was investigated immediately after the slicing and after the sliced iris root was placed in a hermetic container and stored at room temperature for one year, two years, and three years.

Note that the degree of aging of the iris fragrance was indexed to the content of irones ($\alpha$-irone, $\gamma$-irone)— important ingredients of the iris fragrance in an extract obtained by Soxhlet extraction of the test sample or standard sample. The greater the content, the more advanced the aging shown.

The following Table shows the results of a comparison of the content of irones in the test sample and standard sample.

TABLE II-1

|  | (mg/g dry cell weight) | |
| --- | --- | --- |
|  | $\alpha$-irone | $\gamma$-irone |
| Test Sample II-1 | | |
| Immediately after homogenization | 0 | 0 |
| After Heating of Homogenized root (50° C./27 days) | 0.70 | 0.99 |
| Standard Sample II-2 (Comparative) (sliced) | | |
| 1 year storage | 0.19 | 0.20 |
| 2 year storage | 0.63 | 0.17 |
| 3 year storage | 1.23 | 1.49 |

In FIG. 1, the degrees of aging of the iris in Test Samples II-1 to II-2 are illustrated together with the results of Test Samples I-1 to I-4, wherein 6 indicates the homogenized Test Sample II-1-ii) and 7-i), 7-ii) and 7-iii) indicate 1-year storage, 2-year storage and 3-year storage of the sliced root, respectively.

From these results, it became clear that the aging of the iris was remarkably promoted by just homogenizing the rootstalk of the iris quickly after harvesting and by further continuously heating the homogenized iris root.

Thus, according to the second aspect of the present invention, there is advantageously provided a means for promoting the aging of a natural flavor or fragrance and remarkably shortening the aging period, which is often extremely long, when producing a natural flavor or fragrance.

What is claimed is:

1. In a process for producing a natural flavor or fragrance from a plant, the improvement comprising the steps of:

unicellularizing a plant usable as a starting material for a flavor or fragrance by enzymatically treating intercellular pectin, without destroying the cell walls of the plant, whereby aging of the flavor or fragrance is promoted.

2. A process according to claim 1, further comprising collecting the flavor or fragrance.

3. A process according to claim 1, further comprising heating a unicellularized plant whereby aging of the-flavor or fragrance is additionally promoted.

4. A process according to claim 3, wherein said heating is performed between 45° C. and 70° C.

5. A process according to claim 3, wherein said heating is continuous for at least 11 days.

6. A process according to claim 3, further comprising applying a second enzymatic treatment and/or chemical treatment to said unicellularized plant whereby aging of the flavor or fragrance is further promoted.

* * * * *